J. V. HACKETT.
COASTING SLED.
APPLICATION FILED APR. 12, 1913.
1,099,700.
Patented June 9, 1914.
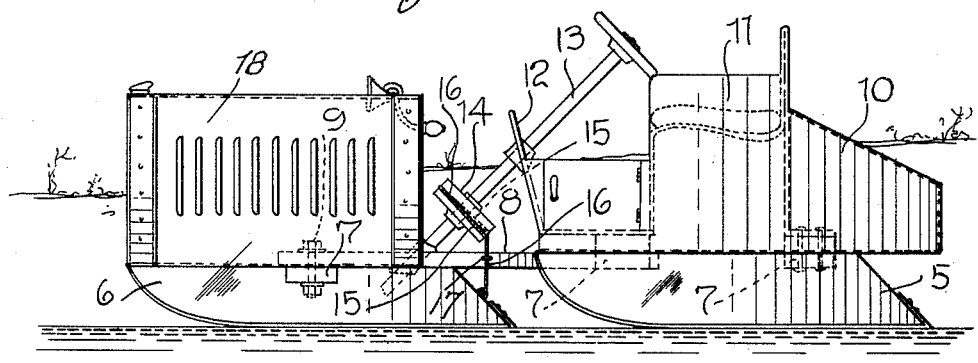
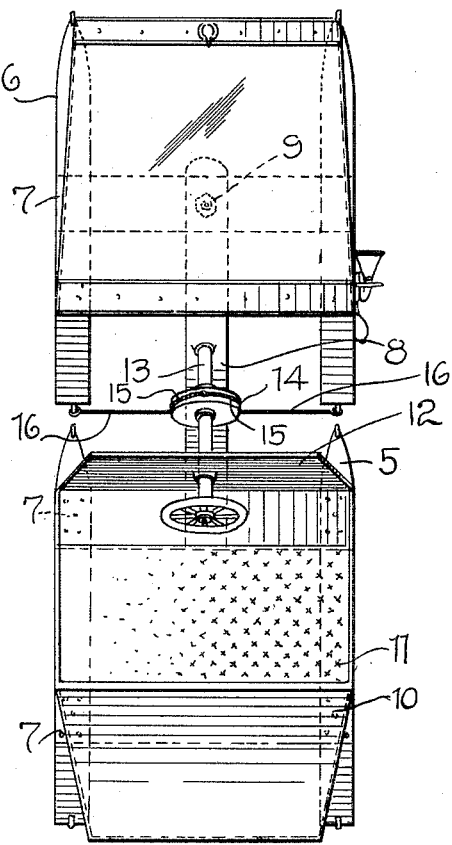
Witnesses
Robert M. Sutphen
A. I. Hind
Inventor
J. V. HACKETT
By Watson E. Coleman
Attorney

UNITED STATES PATENT OFFICE.

JOHN V. HACKETT, OF TYLER, PENNSYLVANIA.

COASTING-SLED.

1,099,700.

Specification of Letters Patent.

Patented June 9, 1914.

Application filed April 12, 1913. Serial No. 760,706.

*To all whom it may concern:*

Be it known that I, JOHN V. HACKETT, citizen of the United States, residing at Tyler, in the county of Clearfield and State of Pennsylvania, have invented certain new and useful Improvements in Coasting-Sleds, of which the following is a specification, reference being had to the accompanying drawings.

This invention relates to an improved coasting sled and has for its primary object to produce a device of this character which is attractive and ornamental in appearance and may be readily steered without requiring the user to move from his seat.

The invention has for another of its objects the provision of a pair of sled trucks one of which has a tongue or pole rigidly fixed thereto and a forward steering truck pivotally mounted upon the end of said pole, a miniature automobile body on the rear truck, and steering means extending through the dash board of said body having a flexible connection with the runners of the forward truck.

Another object of the invention resides in the provision of a coasting sled of the above described type which may be produced at small manufacturing cost, and is extremely strong and durable in use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a coasting sled embodying the present invention; Fig. 2 is a top plan view thereof.

Referring in detail to the drawing, 5 designates the rear sled truck and 6 the front truck. Each of these trucks consists of the usual parallel runners having reinforcing irons on their lower edges, said runners being connected at their upper ends by one or more transverse bars indicated at 7. To the forward transverse bar 7 of the rear truck the rear end of a tongue or pole 8 is fixed. The forward end of this pole is centrally connected to one of the transverse bars of the front truck 6 by means of the king bolt indicated at 9.

10 designates a miniature automobile body which is built upon the runners of the rear truck 5, said body being provided with a suitable seat 11 and a cowl or dash board 12. Through the dash board 12 the inclined steering shaft 13 extends, the lower end of this shaft being mounted to rotate in the forwardly extending tongue or pole 8. A wheel 14 is fixed upon the steering shaft immediately above the pole 8 and in substantially vertical alinement with the rear of the front truck and is provided with spaced grooves 15 in its periphery. These grooves communicate at one point at which the ends of the flexible steering wires 16 are secured to the periphery of the wheel. These wires are received in the spaced grooves of the wheel when the same is rotated, the other ends of the respective wires being secured to the rear ends of the runners of the forward truck 6. The upper end of the inclined steering shaft 13 is provided with a suitable hand wheel whereby said shaft may be rotated. To opposite sides of the pole 8, eyes 17 are secured through which the steering wires 16 extend, whereby a substantially straight lateral pull may be imparted to the front truck.

18 indicates a radiator hood which is mounted upon the runners of the front truck.

From the above description the construction and manner of operation of the invention will be fully and clearly understood.

By providing the rear truck with the automobile body, the attractive appearance of the sled is as a whole greatly enhanced and by providing the inclined steering shaft, the front truck may be turned as desired to steer the sled without requiring the operator to move from his seat.

It is of course apparent that the specific construction of the sled trucks may be greatly modified in many respects and the rear truck may also be provided with any desired directing means. I therefore reserve the right to resort to all legitimate modifications which may fall within the scope of the invention as claimed, while retaining the essential characteristics thereof, as above pointed out.

Having thus described the invention, what is claimed is:

A device of the character described including alined sled trucks, such trucks being provided with bodies in simulation of an automobile body, the body on the rear truck being provided with a seat; a central longitudinally extending pole carried by the rear truck and in pivotal engagement with the forward truck at substantially the center thereof, a body supported upon the rear truck, a rearwardly inclined shaft rotatably supported by the body and by the pole at a point above the forward truck and being provided with operating means, the upper extremity of such shaft terminating in close proximity to the seat of the rear body, a wheel fixed to the shaft in substantially vertical alinement with the rear of the front truck and in close proximity to the pole, flexible steering members secured to the wheel on the shaft and to the rear ends of the respective runners of the front truck and in substantially vertical alinement with the lower periphery of the wheel, and guiding means projecting from the sides of the pole below the wheel and in substantially the same vertical plane as the points of connection of the flexible members with the runners whereby a straight lateral pull is imparted to the front truck upon rotation of the shaft.

In testimony whereof I hereunto affix my signature in the presence of two witnesses.

JOHN V. HACKETT.

Witnesses:
J. C. KERCHNER,
Mrs. J. V. HACKETT.

Copies of this patent may be obtained for five cents each, by addressing the "Commissioner of Patents, Washington, D. C."